UNITED STATES PATENT OFFICE 1,998,550

PREPARATION OF WETTING AGENTS FOR USE IN MERCERIZING LYES

Heinrich Lier, Basel, Switzerland, assignor to the firm of Chemical Works formerly Sandoz, Basel, Switzerland No Drawing. Application July 22, 1931, Serial No. 552,547. In Germany July 30, 1930

8 Claims. (Cl. 8—20)

It is known that the wetting power of an alkali lye can be increased by adding thereto small quantities of suitable mixtures, consisting on one hand of phenols and on the other hand of various organic compounds that possess the property of acting as wetting agents when used in the alkaline lyes together with phenols. Such compounds are for instance hydrogenated aromatic substances, ketones, amines and substituted amines, mono- and poly-hydric aliphatic alcohols, araliphatic alcohols, ethers of polyhydric alcohols which are characterized by the presence of at least one free hydroxylic group and at least one R—O—R$_1$—group, wherein R and R$_1$ represent alkyl, aralkyl, aryl, alkylidene, aralkylidene, alkylene, aralkylene and arylene groups or their mixtures.

It has now been found that alicyclic carboxylic acids which hitherto have never been used for this purpose, possess the valuable property of increasing the wetting capacity of alkaline lyes when they are used together with phenols or with the already known mixtures, consisting of phenols and of the above cited known wetting agents for alkalizing lyes.

The alicyclic carboxylic acids that I propose to use for carrying out the present invention are for instance the purified or raw natural naphthenic acids occurring in the oil which issues from the earth and which until now have been considered as useless. Further I propose to use the resin acids which are present in most of the natural resins and known under the names of abietic acid, pimaric acid, and colophonic acid, or the technical mixtures of these acids. All these products have the great advantage to be very cheap and to remain in the alkaline lyes unchanged, thus imparting thereto very stable wetting properties. They possess further the valuable property of remaining in the alkaline lyes during the concentration process of the diluted lyes, because they are not volatile and can, therefore, be used again like the caustic soda itself.

In order to obtain the new compositions of matter the alicyclic carboxylic acids may be mixed with phenols, such as phenol, cresols, xylenols, chlorophenols, chlorocresols or mixtures of these different compounds. To such mixtures, various compounds that act as wetting agents in alkaline lyes when used together with phenols, may be added. Such compounds are hydrogenated aromatic substances such as hydrogenated phenols, tetrahydronaphthols and the like, monohydric and polyhydric alcohols, such as butyl-, propyl, amyl-, allyl-, benzyl alcohols, the homologues of glycol and glycerine, such as tetramethylethyleneglycol, the hydrogenated polyphenols, the methylcyclohexandiols and the like, tetraethylhexan-1-6-diol and others, the mono (alkyl-, aralkyl-, aryl-) ethers of glycol and polyethylene glycols, the polyethyleneglycols themselves, mono- and dialkyl-ethers and the acetals of glycerine, nitrogen-containing organic bases such as benzylamine, aniline, phenyltrimethylammoniummethylsulphate, triethanolamine, phenetidine, pyrrol, pyridine, monoacylated ethylene diamines and the like, ketones and their derivatives containing the aliphatic linked hydroxyl group, such as acetone oil, cyclopentanone, cyclohexanone, camphor, diacetone alcohol and the like.

The mixtures prepared according to the present process when added in small quantities to alkaline lyes greatly increase their wetting-out power and allow, therefore, to rapidly and evenly mercerize raw sized cotton fibres and fabrics. The wetting-out capacity of the lyes remain unchanged a very long time even if they have been heated for a long time.

The new compositions of matter allow, therefore, to increase the wetting-out action of alkaline lyes, they act very intensively and possess further the great advantage to be very cheap in their manufacture.

The following examples illustrate the present process, the parts being by weight.

Example 1

To a mercerizing lye of 30° Bé. are added at 5° C. 1.43 parts of a mixture consisting of 80 per cent of p-chlorophenol and 20 per cent of purified technical naphthenic acids mixture (boiling point at 20 mm. Hg. about 60–220° C.). The clear solution thus obtained wets immediately and evenly raw sized cotton fabrics which shrink very intensively.

Comparative lyes of the same strength but containing only 1.43 parts of p-chlorophenol or of naphthenic acids possess only a very small wetting power and cannot be used technically for the purpose of mercerizing raw fabrics.

Example 2

To a mercerizing lye of 30° Bé. are added 0.8 parts of a mixture consisting of 80 per cent technical xylenol mixture and 20 per cent of a fraction of naphthenic acids boiling at 20 mm. Hg. at 130–155° C. The lye thus obtained possesses an excellent wetting-out action.

If this lye is diluted with water and concentrated again to its primordial volume, its wetting-out action remains absolutely unchanged. It impregnates raw sized fabrics very rapidly and evenly.

Example 3

A raw cotton fabric is mercerized with a lye of 40° Bé. at 15° C. containing 1.1 parts of a mixture consisting of 80 per cent of raw cresols and 20% of purified, technical naphthenic acids mixture (used in Example 1). The mercerized effect is very even and rapid and the fibres possess a very good lustre.

Example 4

To a mercerizing lye of 35° Bé. are added under good stirring 0.96 parts of technical xylenol mixture and thereupon 0.34 parts of raw naphthenic acids (boiling point at 30 mm. Hg. between 60–250° C.). The lye thus obtained possesses a good wetting-out power and can be used for mercerizing raw cotton fibres.

Example 5

To a mercerizing lye of 28° Bé. at 15° C. are added 1.2 parts of a mixture consisting of 4 parts of technical xylenol mixture and 1 part of purified technical naphthenic acid (used in Example 1). The lye thus obtained possesses a very good wetting-out action. The raw cotton fibres treated with this lye shrink very rapidly to about 21% of their original length.

Example 6

To a mercerizing lye of 28° Bé. at 15° C. are added 1.5 parts of a mixture consisting of 84 per cent of technical raw cresol mixture and 16 parts of colophonium. The lye thus obtained possesses remarkably good wetting-out properties and can be used for mercerizing raw sized cotton fabrics.

Example 7

To a mercerizing lye of 30° Bé. are added 1.24 parts of a mixture consisting of 80% of technical xylenol mixture, 18% of colophonium and 2% of diethyleneglycolmonobutylether. The lye obtained in this manner wets out more rapidly raw cotton fabrics as compared to the lye containing a mixture consisting only of 80% technical xylenol mixture and 20% of colophonium.

The total shrinking obtained with the lye containing diethyleneglycolmonobutylether is after 60 seconds of 27.5%, whereas the lye which does not contain the glycolether gives after 60 seconds a shrinking of 17.8% only.

Example 8

To a mercerizing lye of 30° Bé. are added 1.22 parts of a mixture consisting of 90% of technical xylenol mixture, 6% of technical naphthenic acids mixture and 4% of diethyleneglycolmonobutylether. The lye thus obtained possesses a very good wetting-out power and allows to rapidly mercerize raw sized cotton fibers and fabrics.

When diluted with water, it can be concentrated again to the primordial volume and strength without any loss in its wetting-out power occurring.

Example 9

To a mercerizing lye of 30° Bé. are added 1.2 parts of a mixture consisting of 90% of technical xylenol mixture, 6% of technical naphthenic acids mixture and 4% of technical methylcyclohexanols mixture. The lye prepared in this way possesses a very high wetting-out action and impregnates raw cotton fibres very rapidly and gives a very even lustre.

Example 10

To a mercerizing lye of 32° Bé. are added 1.1 parts of a mixture consisting of 90% of technical xylenol mixture, 5% of purified naphthenic acids mixtures and 5% of tetrahydronaphthaline. The lye thus obtained possesses a much better wetting-action than the lye which does not contain naphthenic acids.

Example 11

A raw sized cotton fabric is mercerized at 15° C. with a lye of 30° Bé. containing 1.2 parts of a mixture consisting of 90% of technical xylenol mixture, 7% of naphthenic acids mixture and 3% of methylcyclohexanone. The mercerizing is very rapid and even and the lustre obtained is very high.

Example 12

To a mercerizing lye of 35° Bé. at 15° C. are added under good stirring first 1.35 parts of technical xylenol mixture, then 0.075 parts of technical naphthenic acids mixture and finally 0.075 parts of triethanolamine.

The lye prepared in this way possesses an excellent wetting-out power and allows to mercerize very rapidly raw sized cotton fabrics.

What I claim is:

1. A process for mercerizing cellulosic fibres, in which the material is subjected to a treatment with alkaline mercerizing lyes containing phenols and alicyclic carboxylic acids.

2. A process for mercerizing cellulosic fibers, in which the material is subjected to a treatment with alkaline mercerizing lyes containing phenols and naphthenic acids.

3. Mercerizing lyes possessing a high wetting-out power and containing phenols and alicyclic carboxylic acids.

4. Mercerizing lyes possessing a high wetting-out power and containing phenols and naphthenic acids.

5. The mixtures of phenols and naphthenic acids, which are strong-wetting-out agents for mercerizing lyes.

6. A process for mercerizing cellulosic fibers, in which the material is subjected to a treatment with alkaline mercerizing lyes containing phenols and resin acids.

7. A process for mercerizing cellulosic fibers, in which the material is subjected to a treatment with alkaline mercerizing lyes containing phenols and colophonium.

8. Mercerizing lyes possessing a high wetting-out power and containing phenols and resin acids.

HEINRICH LIER.